Dec. 2, 1947.   R. H. NISBET ET AL   2,431,706
DEVICE RESPONSIVE TO THE RATE OF TURN OF A CRAFT
Filed Aug. 25, 1942    2 Sheets-Sheet 1

Dec. 2, 1947.  R. H. NISBET ET AL  2,431,706
DEVICE RESPONSIVE TO THE RATE OF TURN OF A CRAFT
Filed Aug. 25, 1942  2 Sheets-Sheet 2
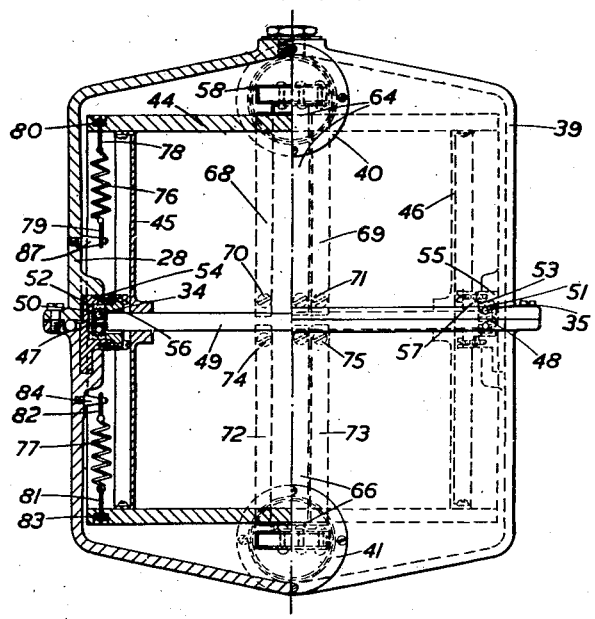
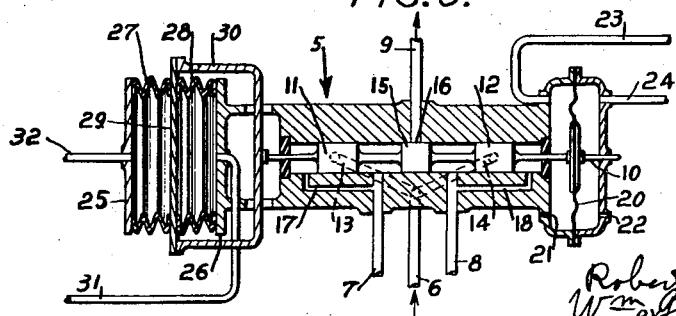

Patented Dec. 2, 1947

2,431,706

UNITED STATES PATENT OFFICE 2,431,706

DEVICE RESPONSIVE TO THE RATE OF TURN OF A CRAFT

Robert Hayes Nisbet, Stroud, and William George Harding, Whitton, England, assignors to The Sperry Gyroscope Company, Limited, Brentford, England, a British company Application August 25, 1942, Serial No. 456,298
In Great Britain May 10, 1941

3 Claims. (Cl. 60—54.5)

1

This invention provides novel apparatus for use on craft for measuring the rate of turn of the craft either for indicating said rate of turn or for control purposes.

According to the invention means are provided responsive to the rate of turn of a craft about an axis, comprising an inertia member pivoted in substantially neutral equilibrium about said axis, or about an axis parallel to it; means for yieldingly constraining said inertia member towards a fixed position relative to the craft in such manner that the resonant period of the member and its constraint is longer than the period of naturally occurring oscillations of the craft about said axis; fluid damping means for damping oscillations of the inertia member relative to the craft; and means responsive to the pressure difference developed in said fluid damping means for providing indications or control values.

The apparatus is not responsive to a steady turn, or, to be more accurate, if a turn is suddenly initiated at a given rate and this rate of turn is maintained, the device initially provides a signal proportional to the rate of turn of the craft, but this signal gradually falls off and finally becomes zero. The time interval before the signal becomes zero depends on the oscillation period of the inertia member on its constraint and this should therefore be long.

The device is thus not suitable for indicating steady or prolonged rates of turns, but it nevertheless is of considerable practical use, particularly as an auxiliary controller on an automatic pilot, e. g., for aircraft, as it is suitable for measuring and indicating the rates of turn occurring during the ordinary disturbances to the craft in yaw, pitch or bank. For such purposes the device is very convenient, as it is self-contained and can be completely sealed against leakages. Furthermore, it requires no continuous supply of electricity, or pressure fluid, or other form of energy, to make it operative.

The device is particularly suitable in control systems of the kind in which the servo-motor controller, e. g., a valve controlling the supply of fluid to a fluid pressure servo-motor, operates in accordance with pressures applied to it rather than in accordance with movements applied to it.

One form of the invention as applied to provide an auxiliary control term dependent on the rate of turn of an aircraft in the fore-and-aft vertical plane for use in automatic control systems for controlling the elevator of the craft will now be described with reference to the accompanying drawings in which Fig. 1 is a schematic diagram of the control system inclusive of a sectional elevation of an inertia device according to the invention.

Fig. 2 is a sectional elevation of the inertia device of Fig. 1 in a plane at right angles to the plane of section in Fig. 1.

Fig. 3 is a cross-section, on a larger scale, of the relay valve shown in Fig. 1.

Figure 1:
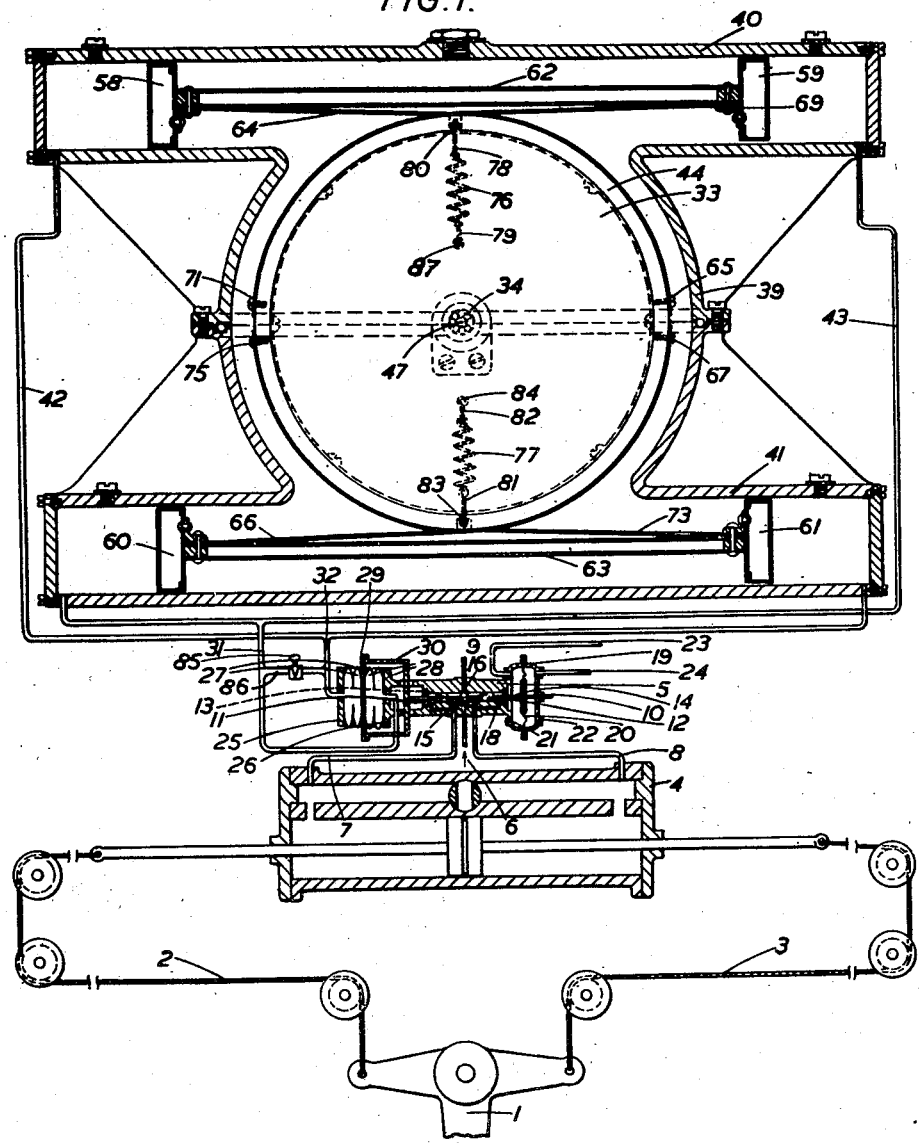

Referring to the drawings, the elevator 1 of the craft is connected by means of cables 2, 3 to the piston rod of a hydraulic servo-motor 4. Movement of the servo-motor and therefore of the control surface is controlled by means of the distributing valve 5, movement of which admits pressure fluid from an inlet pipe 6 into one or other of pipes 7 and 8 leading to opposite ends of the servo-motor, and at the same time permits fluid in the other of said pipes to flow to exhaust via the pipe 9. For this purpose the piston rod 10 of the valve is provided with pistons 11, 12, which normally cover inlet ports 13, 14 connected with the pipe 6, and with a piston 15 which normally covers an exhaust port 16 connected with the pipe 9. It is readily seen that if a force is applied axially to the piston rod, say to the left, the rod will be displaced to the left and admit pressure fluid from the pipe 6 via port 13 to the space between pistons 13 and 15 and thence via the pipe 7 to the left hand end of the servo-motor 4. At the same time fluid from the right hand end of the servo-motor is put into communication via pipe 8 and port 16 with the exhaust pipe 9. The elevator 1 will therefore be deflected, which will result, if the aircraft is flying, in the setting up of aerodynamic forces on the elevator resisting further deflection. This resistance appears as a pressure difference between the two ends of the servo-motor and therefore between the pipes 7 and 8. This pressure difference is communicated via passages 17, 18 to the end spaces in the distributing valve and therefore acts in opposition to the applied force that initially moved the piston rod. The result is that the valve closes again as soon as the opposition force reaches a value equal to, or just in excess of, the total actuating force applied to the piston rod. The servo-motor movement thus depends (under given flight conditions) on the actuating force applied to the control valve 5.

Automatic control systems for aircraft having the features already described are disclosed in United States Patents Nos. 2,210,917 and 2,210,916. These features therefore do not constitute the present invention, and the foregoing description is relevant to the invention chiefly as demonstrating that the response of the system is proportional to the total force applied to the piston rod 10 of the relay valve.

The piston rod 10 is actuated by forces applied to it by flexible diaphragm devices. As shown, a diaphragm chamber 19 is attached to the right hand end of the housing of valve 5 and is partitioned into two compartments by the flexible diaphragm 20 which is attached to the piston rod 10. Air inlets 21, 22 are provided in the walls of the chamber 19, through which air enters to leave again by pipes 23, 24 leading to a controlling gyro-horizon which serves to vary differentially in dependence on inclination of the craft at which air flows in these two pipes and thus to produce a pressure difference which is applied to the diaphragm 20. In this way the gyro-horizon actuates the relay valve by applying to it a control value, in the form of a force, dependent on the angle of tilt of the craft. The present invention enables a second control value additive to the first to be applied to the valve rod 10. For this purpose there is secured to the housing of the valve rod 10 a double-walled bracket 25, 26. Between the two fixed walls 25, 26 there is mounted a double set of flexible bellows or capsules 27, 28 secured to a central floating wall 29 which is connected by means of the frame 30 with the piston rod 10. Pipes 31, 32 communicate respectively with the interior of the two sets of bellows 27, 28. It follows that a fluid pressure difference applied to the pipes 31, 32 will cause a pressure difference on the two sides of the partition wall 29 and thus cause a force to be applied to the piston rod 10.

The present invention enables a pressure difference to be applied to the pipes 31, 32 in dependence on the rate of turn of the craft in the plane of pitch. Thereby the automatic control system operates to produce an elevator movement depending on the sum of two control values one dependent on the angle of inclination in pitch and the other dependent on the rate of change of this angle.

The rate of turn instrument of the invention comprises an inertia member or drum 33 pivotably mounted by means of frictionless miniature ball-bearings 34, 35 in a totally enclosed outer casing 39. The casing is provided with parallel hollow cylindrical chambers 40, 41 at opposite ends of, and extending on both sides of, a diameter through the axis of the inertia member 33. The diagonally opposite ends of the cylindrical chambers 40, 41 form pressure chambers and are interconnected by pipes 42, 43 and each diagonal pair of pressure chambers is connected to one of the pipes 31, 32 connected to the bellows device 27, 28.

The whole of the interior of casing 39 inclusive of the cylindrical extensions 40, 41 and together with the piping 42, 43, 31, 32 and the bellows chambers 27, 28 is filled with oil or other fluid suitable for use in a hydraulic control system, and this is used to float the inertia member 33. For this purpose the inertia member 33 is constructed in the form of a hollow cylinder 44 having end walls 45, 46 which enclose and hermetically seal a large space filled with air in the interior of the inertia member. This space is of such a size that the inertia member as a whole substantially floats in the liquid, and practically no weight rests on the bearings 34, 35. For this reason miniature ball-bearings of the sensitive instrument type can be employed with extremely low friction. The bearings are mounted on the end portions 47, 48 of the shaft 49 of the inertia member, these portions being of very greatly reduced diameter. The outer races 50, 51 of the ball-bearings are floatingly mounted in resilient material 52, 53 carried in housings 54, 55 which are secured to the interior of the casing 39. This resilient material serves two purposes: on the one hand it prevents damage to the bearings due to high frequency vibrations applied to the casing 39 from the aircraft, and, on the other, it allows the main shaft 49 to come into contact with auxiliary plain bearings or supports 56, 57 secured to the bearing housing, if the inertia member 33 should become displaced from its normal position relative to the casing 39 as a result of shocks or accelerations acting on it. The plain bearings 56, 57, which normally have a very small clearance round the shaft 49, thus serve in conjunction with the resilient supports 52, 53 for the bearings 34, 35 to prevent dangerous lateral loads from being applied to the thin pivots 47, 48.

The inertia member 33 is connected to actuate fluid displacing members such as pistons 58, 59, 60, 61 which are adapted to travel in the hollow cylindrical extensions 40, 41 of the instrument case. The pistons 58, 59, travelling in the cylinder 40 are interconnected by a piston rod 62; similarly the pistons 60, 61, travelling in the cylinder 41 are interconnected by a piston rod 63. The pistons and piston rods are all of hollow construction so as substantially to float in the liquid in which they are immersed, thus minimising friction.

The interconnection between the piston rods 62, 63 and the inertia member 33 is effected by means of metal tapes. A broad central tape 64 is secured to the left hand end of the rod 62 and extends to meet the cylinder 44 of the inertia member 33 tangentially and thence part of the way round the circumference of the inertia member until it is secured at 65. A similar metal tape 66 connects the left hand end of piston rod 63 to the inertia member 33 at the point 67. To the right hand end of piston rod 62 are connected two parallel tapes 68, 69, which meet the cylinder 44 tangentially and pass round it to be secured thereto at 70, 71. Similarly the tapes 72, 73 serve to interconnect the right hand end of piston rod 63 to points 74, 75 on the inertia member.

The inertia member 33 is spring-centralised into a central position relative to its casing 39 by means of a pair of tension springs 76, 77. Spring 76 is connected by means of flexible threads or cords 78, 79 to the inertia member 33 at the point 80 on the one hand and to a post 87 fixed in the casing 39 on the other hand. Similarly spring 77 is connected by means of flexible threads or cords 81, 82 to the inertia member 33 at 83 on the one hand and to a post 84 fixed to the casing 39 on the other hand. The two tension springs are directed radially and act in the same straight line; their initial tensions and their characteristics are matched so that the forces they exert on the inertia member are balanced. If the inertia member should become turned about its axis relative to the casing, the forces exerted by the tension spring 76 alter slightly but they remain equal; they no longer act in the same straight line and therefore they exert a restoring couple tending to bring the inertia member back to its centralised position relative to the casing 39. Owing to its high inertia the inertia member 33 tends to remain constant in direction about its axis of support if the craft, and therefore the casing 39, should turn about this axis. A relative rotation between the casing 39 and the inertia member 33 is therefore set up and the springs 76, 77 are extended, so that a torque is exerted on the inertia member which causes the latter to turn with an angular acceleration. The springs 76, 77 are, however, so designed that, during an oscillation of the craft about its pitch axis, the torques imparted to the inertia member are insufficient to give it angular accelerations greater than a fraction, and preferably a small fraction, of those possessed by the craft. For this reason the inertia member does not acquire an angular velocity that exceeds a fraction of the peak angular velocity of the craft during its oscillation. This condition is equivalent to the statement that the natural period of oscillation of the inertia device 33 on the springs 76, 77 is longer, and preferably considerably longer, than the period of oscillation of the craft. As a result of this condition, the inertia member may be considered to be substantially stationary during an oscillation of the craft. The purpose of the centralising springs 76, 77 is merely to act as means for defining the central position for the combination of the inertia member and the pistons connected to it in order to prevent cumulative rotation of the inertia member as the possible result of a series of accidental causes.

Suppose now that an angular rotation about the pitch axis is imparted to the craft, so that the casing 39 starts to rotate clockwise as seen in Fig. 1. The pressure fluid in the left hand end of cylinder 40 and in the right hand end of cylinder 41 becomes compressed whereby a difference of pressure is generated between one diagonal pair of cylinder ends or pressure chambers and the other diagonal pair. A difference of pressure is therefore developed between the pipes 31, 32. This constitutes the output pressure from the inertia device, which is applied to the bellows device 27, 28, no other source of energy being necessary to actuate these bellows.

The output pressure causes pressure fluid to leak past the pistons 58, 59, 60, 61. The rate at which this leak takes place is liable to vary in different instruments owing to differences in manufacture; an adjustment is therefore provided, in the form of an adjustable constriction 85 in a by-pass pipe 86 which interconnects pipes 31, 32. This enables the total rate of leakage flow resulting from a given pressure difference to be standardised.

The rate of leakage flow is adjusted to have a value such that, during an oscillation of the craft, the flow exceeds, and preferably greatly exceeds, the flow into the bellows device 27, 28 to actuate the valve stem 10, and also such that the flow is high enough to prevent the pressures developed in the ends of the cylinders from reaching a value that will apply to the inertia member a torque as large as that imparted during the same oscillation by the centralising springs 76, 77. This condition is equivalent to the statement that the damping that is produced by the hydraulic fluid of the natural oscillations of the combination of the inertia member 33 and the centralising springs 76, 77 therefor should not be very great.

When the two conditions of low natural frequency and low damping are satisfied, the inertia member 33 remains substantially undisturbed during an oscillation of the craft. It follows that the output pressure difference, which is proportional to the rate of leakage flow and therefore to the angular velocity of the casing 39 relative to the inertia member 33, is substantially proportional to the angular velocity of the craft throughout an oscillation of the craft.

Another method of considering the operation of the device is to examine the effect of the sudden application of a turning movement of the craft which quickly attains a final value that is thereafter maintained. The device then at first produces an output pressure rising quickly with the growth of the angular velocity of the craft till it reaches a peak value proportional to the final angular velocity of the craft. Thereafter the output pressure begins to die away again at a low damping rate even although the rate of turn may remain constant. The time that elapses before the output pressure falls to a specified fraction of its initial peak value is proportional to the natural period of the inertia device on the centralising spring. It is therefore desirable to make this time long. However, it must be appreciated that the device will not serve to indicate the rate of turn of the craft during a prolonged turn.

For control purposes the device is quite satisfactory in that it serves to provide an indication which is a function of the rate of turn of the craft capable of being used as an auxiliary control term, as in the control system of the drawing. Such a control term acts to damp out oscillations of the craft when under automatic control. For this purpose it is not essential that the indication provided, i. e., the output pressure, shall be proportional with considerable exactitude to the rate of turn of the craft, and it is therefore possible, in order to render the device more sensitive, to relax the conditions that must be applied to the design of the device if substantial proportionality is to be secured. It is still necessary that the natural period should be longer than the period of oscillation of the craft, but it need not be many times longer, and a fairly high damping factor may be used that will make the damping forces applied hydraulically to the inertia device attain values of the same order as the centralising forces applied by the springs.

With slight modifications the device may be used for providing indications or control values depending on the rate of turn of the craft about any of its three principal axes. It is clear that it can be used in control systems other than that shown in Fig. 1 and in particular that it can be used to actuate an indicating instrument. For the latter purpose the partition of the bellows device 27, 28 may, for example, be provided with a rack engaging with a pinion that actuates a pointer.

It will be understood by those skilled in the art that various constructional modifications of the above described devices are possible. For example the hollow cylindrical inertia member may be associated with only two damping pistons instead of the four pistons described; also instead of the two aligned bellows devices having two fixed end walls and a movable intermediate wall common to both, the intermediate wall may be fixed and the two end walls be coupled together and movable.

What we claim is:

1. In automatic pilots for dirigible craft, controlling means comprising a casing providing a closed fluid filled reservoir having therein a plurality of cylinders, a hollow fluid tight drum elastically suspended within said reservoir constituting an inertia mass, piston means operating in said cylinders operatively connected to said mass, means for centralizing said mass in said casing, a pilot controlling relay, and connections between said relay and the cylinders; said relay, connections, and cylinders forming a closed fluid system in which the relay responds to operation of said piston means as the casing and mass move relatively to one another with movement of the craft.

2. Controlling means as claimed in claim 1, in which said inertia mass and its centralizing means are so constructed and arranged that the natural period of oscillation thereof is longer than the normal period of oscillation of the craft about the axis of control.

3. Controlling means as claimed in claim 1, in which the casing is constructed to include four cylinders, and in which said piston means provides pistons for each of the four cylinders that are connected in pairs.

ROBERT HAYES NISBET.
WILLIAM GEORGE HARDING.

REFERENCES CITED

The following references are of record in the file of this patent:

UNITED STATES PATENTS

| Number | Name | Date |
| --- | --- | --- |
| 752,491 | Warren | Feb. 16, 1904 |
| 1,509,743 | Wegner | Sept. 23, 1924 |
| 1,935,004 | Winther | Nov. 14, 1933 |
| 1,936,780 | Arnold | Nov. 28, 1933 |
| 1,959,889 | Wünsch | May 22, 1934 |
| 1,998,136 | Jaenichen et al. | Apr. 16, 1935 |
| 2,126,855 | Wünsch et al. | Aug. 16, 1938 |
| 2,191,250 | Fischel | Feb. 20, 1940 |
| 2,208,666 | De Florez | July 23, 1940 |
| 2,283,753 | Harcum | May 19, 1942 |
| 2,293,689 | De Florez | Aug. 25, 1942 |

FOREIGN PATENTS

| Number | Country | Date |
| --- | --- | --- |
| 430,832 | France | Aug. 24, 1911 |
| 752,390 | France | July 17, 1933 |